July 7, 1970 A. J. HUBER 3,519,765

BIDIRECTIONAL AMPLIFIER

Filed Feb. 2, 1967

INVENTOR.

ALVIN J. HUBER

By Mason, Kolehmainen, Rathburn & Wyss. Attys.

3,519,765
BIDIRECTIONAL AMPLIFIER

Alvin J. Huber, Tulsa, Okla., assignor to Seismograph Service Corporation, Tulsa, Okla., a corporation of Delaware Filed Feb. 2, 1967, Ser. No. 613,522
Int. Cl. H04f 3/62
U.S. Cl. 179—170 9 Claims

ABSTRACT OF THE DISCLOSURE

A bidirectional amplifier includes a transistor and a circuit for applying an operating bias to the base electrode. The input is coupled between a supply terminal and one output electrode (collector or emitter), and the output is coupled between the other supply terminal and the other output electrode. A switch reverses the polarity of the supply terminals to reverse the direction of operation, and may also change the operating bias of the base electrode.

FIELD OF THE INVENTION

The present invention relates to bidirectional amplifiers, and has for an object the provision of improved bidirectional amplifiers wherein a transistor is effective to amplify signals in two directions.

PRIOR ART

Bidirectional amplifiers using two or more electron control devices, such as vacuum tubes or transistors, are known. In such amplifiers, different electron control devices are used to amplify signals passing in different directions. Also known are bidirectional amplifiers using an ordinary amplifier, and including a switching arrangement for reversing the input and output terminals of the amplifier to achieve the bidirectional effect.

SUMMARY OF THE INVENTION

In accordance with the present invention, there is provided a novel bidirectional amplifier including a transistor effective to amplify signals traveling in either direction with respect to the transistor. Briefly, a bidirectional amplifier em bodying the features of the present invention may comprise a transistor with a base electrode and a pair of output electrodes, these being the collector and the emitter. As used in the specification and claims hereof, the term "output electrodes" designates the main current carrying electrodes of a transistor, regardless of whether the electrode is used as an "input" or an "output" in a particular circuit application. The amplifier includes a pair of supply terminals for supplying a DC operating potential to the amplifier, and a first circuit couples one of the output electrodes and one of the supply terminals to a first signal sending and receiving device, such as a communication channel, an electroacoustical transducer, or the like. A second circuit couples a second signal sending and receiving device to the other output electrode and to the other supply terminal. A bias circuit applies an operating bias to the base electrode of the transistor, and switching means are provided for changing the polarity of the DC supply in order to reverse the direction of operation of the amplifier.

DESCRIPTION OF THE DRAWING

Many objects and advantages of the present invention will appear from the following detailed description of illustrative embodiments of the invention, in the course of which reference is had to the accompanying drawing, in which.

DESCRIPTION OF THE ILLUSTRATED EMBODIMENTS OF THE INVENTION

Figure 1:
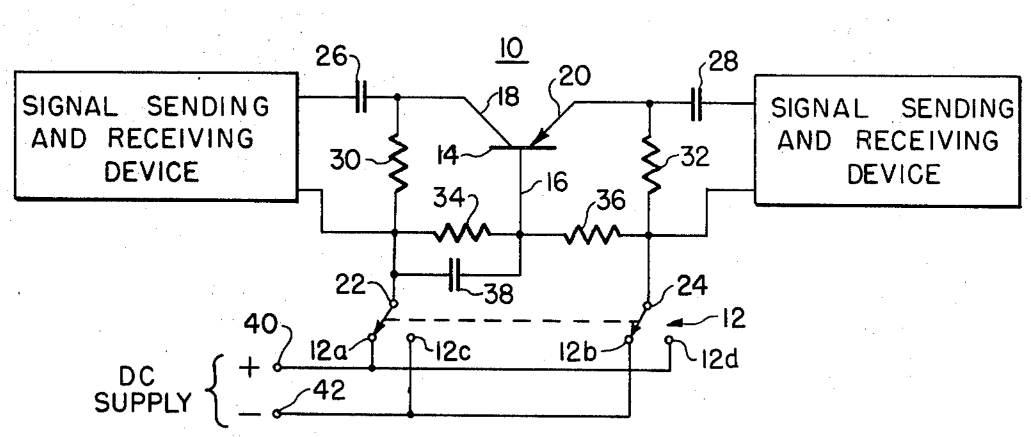
FIG. 1 is a schematic diagram illustrating a bidirectional amplifier constructed in accordance with the present invention.

Referring now to the drawing, and initially to FIG. 1, there is illustrated a bidirectional amplifier embodying the features of the present invention and generally designated by the reference numeral 10. The amplifier 10 is adapted to be used with a pair of signal sending and receiving devices indicated in block form in the drawing. For example, the signal sending and receiving devices may be parts of a communication channel such as a telephone transmission line, or may be electroacoustical transducers, etc.

The amplifier 10 is effective to amplify signals passing in either direction, the direction of operation of the amplifier being determined by a control switch 12. In accordance with an important feature of the invention, the amplifier 10 includes a transistor 14 effective to amplify signals passing in either direction through the amplifier.

More specifically, the transistor 14 includes a base electrode 16 and a pair of output electrodes 18 and 20. In the embodiment of the invention illustrated in FIG. 1, the output electrodes 18 and 20 comprise respectively the collector and emitter electrodes of the transistor 14. It should be understood, however, that a so-called symmetrical or double emitter transistor may be used. In this case, both of the output electrodes would be emitters.

The amplifier 10 includes a pair of power supply terminals 22 and 24 so designated because they serve to supply an operating potential to the amplifier 10. A first circuit including a DC blocking coupling capacitor 26 couples one of the signal sending and receiving devices between the power supply terminal 22 and the collector electrode 18 of the transistor 14. A second circuit including a DC blocking coupling capacitor 28 couples the second signal sending and receiving device between the power supply terminal 24 and the emitter electrode 20 of the transistor 14. A pair of resistors 30 and 32 connect the power supply terminals 22 and 24 with the collector and emitter electrodes of the transistor 14 respectively. An operating bias is applied to the base electrode 16 by a circuit including a pair of resistors 34 and 36, and a collector bypass capacitor 38 is connected between the base electrode 16 and one of the supply terminals.

An operating potential is supplied to the amplifier 10 through the control switch 12 from a source of DC potential indicated in FIG. 1 as a relatively positive terminal 40 and a relatively negative terminal 42. The switch 12 serves to determine the direction of operation of the bidirectional amplifier 10, and includes contacts 12*a* and 12*b* illustrated in the closed position and contacts 12*c* and 12*d* illustrated in the open condition. The switch may be manually operated, relay operated, or, if desired, a diode switching arrangement may be substituted.

In the illustrated position of the switch 12, the supply terminal 22 is at a positive potential while the supply terminal 24 is at a negative potential. In this condition the amplifier 10 is effective to amplify signals traveling from left to right as viewed in the drawing. The transistor 14 is biased to a conductive condition by the bias circuit including resistors 34 and 36 and capacitor 38. Current flows from the supply terminal 22 through the resistor 30, through the collector electrode 18 and emitter electrode 20, and through the resistor 32 to the supply terminal 24. The input signal, appearing across the resistor 30, controls the forward bias across the base-collector junction of the transistor, and thus controls the conductivity of the transistor. The output signal appears across the resistor 32.

In order to reverse the direction of operation of the amplifier 10, the switch 12 is moved from its illustrated position to open contacts 12*a* and 12*b* and close contacts 12*c* and 12*d*. In this condition, the operation of the amplifier is similar to but the reverse of the operation described above.

In a device constructed in accordance with the present invention, the amplifier 10 provided a voltage gain of 35:1 in the direction from left to right, and a gain of 40:1 in the right to left direction. This difference in gains is believed attributable to the non-symmetrical characteristic of the PNP transistor 14. It is believed, however, that if a symmetrical transistor is used, the gain of the amplifier 10 would be the same in either direction.

In the embodiment of FIG. 1, the resistors 34 and 36 preferably have the same value, and the bias potential applied to the base electrode 16 is the same in either position of the control switch 12. For some uses, however, it may be desirable to apply a different bias to the base electrode when operating the amplifier in different directions. This may be done by using different values for the resistors 34 and 36, or by the arrangement of FIG. 2.

Figures 2, 4:
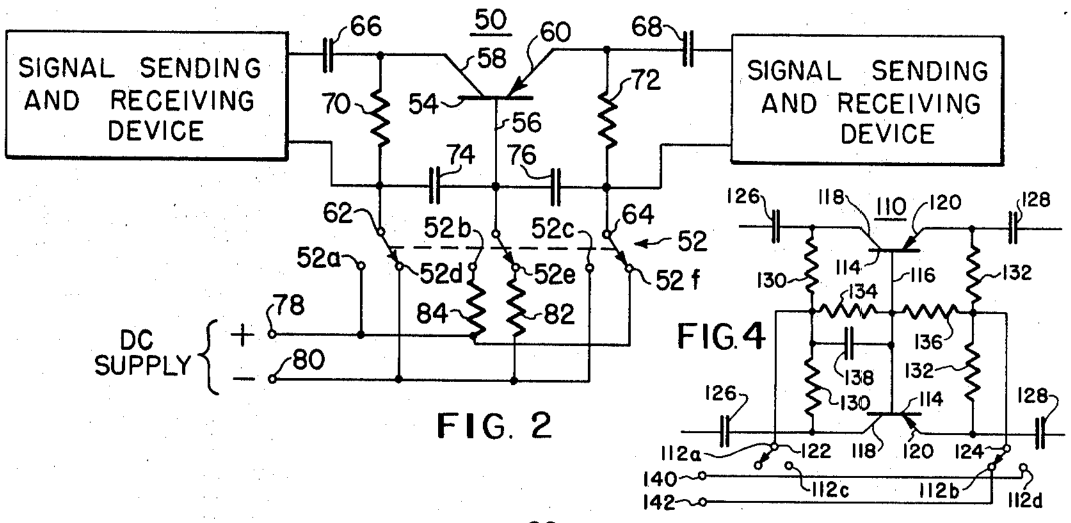
FIG. 2 is a schematic diagram illustrating an alternative embodiment of the invention.
FIG. 4 is a schematic diagram illustrating a variation of the circuit of FIG. 1 adapted for use with integrated circuitry.

Referring now to FIG. 2, there is illustrated an amplifier designated as a whole by the numeral 50 and comprising an alternative embodiment of the invention. The amplified 50 includes a control switch 52 effective not only to reverse the direction of operation of the amplifier, but also to provide a different operating bias depending upon the direction of amplification. In other respects the amplifier 50 is similar to the amplifier 10 illustrated in FIG. 1.

More specifically, the amplifier 50 includes a transistor 54 having a base electrode 56 and a pair of output electrodes 58 and 60 respectively comprising the collector and emitter. The amplifier 50 includes a pair of power supply terminals 62 and 64, and a first circuit including a DC blocking capacitor 66 couples a first signal sending and receiving device between the collector electrode 58 and the power supply terminal 62. A second circuit including a DC blocking capacitor 68 couples a second signal sending and receiving device between the emitter electrode 60 and the power supply terminal 64. The supply terminals 62 and 64 are connected to the collector and emitter electrodes respectively by a pair of resistors 70 and 72, and a pair of bypass capacitors 74 and 76 are coupled between the base electrode 56 and the supply terminals 62 and 64.

An operating potential is supplied to the circuit 50 from a DC voltage supply illustrated as a relatively positive terminal 78 and a relatively negative terminal 80. The control switch 52 includes illustrated open contacts 52*a*, 52*b*, and 52*c*, as well as illustrated closed contacts 52*d*, 52*e* and 52*f*. In the illustrated condition of the control switch 52, the bias circuit for the base electrode 56 includes a resistor 82 connected by the closed contacts 52*e* between the relatively negative terminal 80 and the base electrode 56. In the other condition of the control switch 52, the bias circuit includes a resistor 84 connected by the switch contacts 52*b* between the relatively positive terminal 78 and the base electrode 56.

In the illustrated condition of the amplifier 50, the amplifier is effective to amplify signals traveling from the right to the left. The transistor 54 is biased to a conductive condition by the circuit including the resistor 82. The terminal 64 is at a relatively positive potential, and current flows from the terminal 64 through the resistor 72, the emitter electrode 60, the collector electrode 58 and the resistor 70 to the relatively negative terminal 62. If the control switch is moved to its alternative position, the operation is the reverse, and base electrode 56 is biased to a conductive condition by means of the resistor 84.

Thus, in the embodiment of FIG. 2, the bias of the transistor 54 is changed when the direction of operation of the amplifier 50 is reversed. With this arrangement it is possible to bias the transistor 54 to a more conductive or less conductive condition than is possible in the embodiment of FIG. 1 wherein the base electrode remains at a potential intermediate the relatively positive and relatively negative supply potentials, regardless of the direction of operation of the amplifier.

Figure 3:
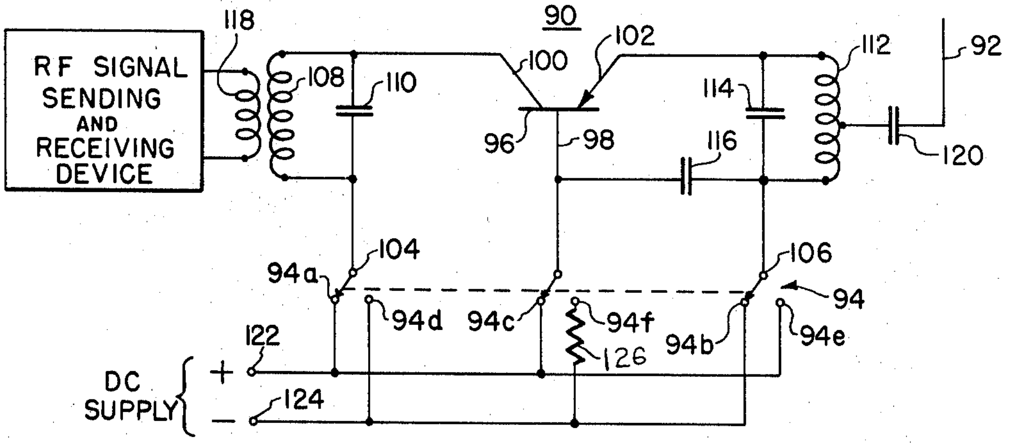
FIG. 3 is a schematic diagram illustrating another alternative embodiment of the invention.

Proceeding now to FIG. 3, there is illustrated a bidirectional radio frequency amplifier embodying the features of the invention and generally designated as 90. The radio frequency amplifier 90 may be used in a radio transceiver device, and is shown in circuit with an antenna 92 serving both to transmit and receive radio signals. Indicated in block form in the drawing is a radio frequency signal sending and receiving device. This device may be of any known construction and may include an oscillator and modulator for supplying RF signals to the amplifier 90 as well as a detector for developing an audio frequency signal from RF signals supplied by the amplifier 90.

As with the above described embodiments of the invention, the amplifer 90 is effective to amplify signals passing in either direction, and the direction of operation is determined by a control switch 94. The amplifier includes a transistor 96 having a base electrode 98 and a pair of output electrodes 100 and 102, these comprising respectively the collector and emitter electrodes.

The amplifier 90 includes a pair of power supply terminals 104 and 106, and a first tank circuit including a winding 108 and a capacitor 110 is coupled between the terminal 104 and the collector electrode 100. Similarly, a second tank circuit including a winding 112 and a capacitor 114 is coupled between the terminal 106 and the emitter electrode 102. A bypass capacitor 116 is connected between the base electrode 98 and the supply terminal 106. The RF signal sending and receiving device is connected to a winding 118 magnetically linked with the winding 108. The antenna 92 is coupled to a tap on the winding 112 by means of a capacitor 120.

As noted above, the direction of operation of the amplifier 90 is determined by the control switch 94, illustrated in position to amplify signals for transmission by the antenna 92. An operating potential is supplied to the amplifier from a source of DC potential indicated as relatively positive and negative terminals 122 and 124. The switch 94 includes illustrated closed contacts 94*a* and 94*b* connecting the supply terminals 104 and 106 to the relatively positive and negative terminals 122 and 124 respectively. An additional closed contact 94*c* supplies a positive bias to the base electrode 98 of transistor 96 to operate it in the class C mode. Signals supplied by the RF signal sending and receiving device are coupled to the tank circuit including winding 108 and capacitor 110, amplified, and coupled to the antenna 92 by the tank circuit including winding 112 and capacitor 114.

When it is desired to amplify signals received from the antenna 92, the control switch 94 is moved to its alternate position to close contacts 94*d*, 94*e*, and 94*f*. In this condition, the supply terminals 104 and 106 are connected to the relatively negative and positive terminals 124 and 122 respectively. A negative bias for class A operation is applied to the base electrode 98 through switch contacts 94*f* and a resistor 126. Signals received from the antenna 92 are coupled through the tank circuit including winding 112 and capacitor 114, amplified, and are coupled to the RF signal sending and receiving device by the tank circuit including winding 108 and capacitor 110.

The features of the present invention are applicable to integrated circuit constructions. Each of the embodiments illustrated in FIGS. 1, 2 and 3 can be adapted for use with differential integrated circuit transistors commercially available by developing the balanced circuit counterparts of the illustrated circuits. For example, referring to FIG. 4 there is illustrated a variation of the circuit of FIG. 1 comprising a balanced bi-directional amplifier 110 making use of a differential pair of transistors 114 such as are available in integrated form.

Since the amplifier 110 is very similar to the amplifier 10 described above, similar reference numerals raised by 100 are used to designate the elements of the amplifier 110. In view of the detailed description of the amplifier 10, it is unnecessary to describe the amplifier 110 in detail. The amplifier 110 differs from the amplifier 10 only in that it is a balanced circuit using a pair of transistors 114, each connected in circuit with resistors 130 and 132, rather than a single transistor.

Similar balanced circuit counterparts, although not illustrated, could be developed for the bidirectional amplifiers illustrated in FIG. 2 and 3 by one skilled in the art. In all of these arrangements, since balanced circuits are used, the signal sending and receiving devices are coupled between output electrodes of the two transistors. For example, in FIG. 4, one of the signal sending and receiving devices would be connected between the capacitors 126, the other between the capacitors 128.

While the present invention has been illustrated and described in connection with certain illustrative embodiments thereof, the invention is not limited to the details described, except insofar as set forth in the accompanying claims. Various other embodiments and modifications can be devised by those skilled in the art that will fall within the spirit and scope of the present invention.

What is claimed as new and desired to be secured by Letters Patent of the United States is:

1. A bidirectional amplifier for use between a pair of signal receiving and sending means, comprising:

a transistor having a base electrode and a pair of output electrodes;

a pair of supply terminals for supplying a DC operating potential to the amplifier;

first circuit means coupling one of the signal receiving and sending means between one of said output electrodes and one of said supply terminals;

second circuit means coupling the other signal receiving and sending means between the other output electrode and the other supply terminal;

a bias circuit for supplying an operating bias to said base electrode;

and switching means connected to said supply terminals for reversing the polarity of the DC supply to reverse the direction of operation of the amplifier.

2. The bidirectional amplifier of claim 1, said bias circuit being coupled between said supply terminals for applying to said base electrode an operating bias intermediate the DC supply potential independently of the direction of operation of the amplifier.

3. The bidirectional amplifier of claim 1, said bias circuit being controlled by said siwtching means so that the operating bias applied to the base electrode is changed when the switching means reverses the direction of operation of said amplifier.

4. The bidirectional amplifier of claim 2, said first and second circuit means each including a DC blocking coupling capacitor connected in series with the corresponding output electrode, and a resistor connected between the corresponding supply terminal and the corresponding output electrode, said bias circuit including a pair of resistors of substantially equal value, each connected between one of said supply terminals and said base circuit.

5. A bidirectional amplifier for use with radio frequency transmitting and receiving antenna means, comprising:

a transistor having a base electrode and a pair of output electrodes;

a pair of supply terminals for supplying a DC operating potential to the amplifier;

a first tank circuit connected between one supply terminal and one output electrode;

a second tank circuit connected between the other supply terminal and the other output electrode;

means coupling one of said tank circuits continuously to the antenna means;

switching means connected to said supply terminals for reversing the polarity of the DC supply to reverse the direction of operation of the amplifier; and bias means controlled by said switching means for operating said transistor in the class C mode when the antenna means is used to transmit and for operating said transistor in the class A mode when the antenna means is used to receive.

6. A balanced bidirectional amplifier for use between a pair of signal sending and receiving means, comprising a pair of transistors each having a base electrode and a pair of output electrodes;

a pair of supply terminals for supplying a DC operating potential to the amplifier;

first circuit means coupling one of the signal sending and receiving means between first output electrodes of each of said transistors;

second circuit means coupling the other signal sending and receiving means between second output electrodes of each of said transistors;

a bias circuit for supplying an operating bias to said base electrodes;

and switching means connected to said supply terminals for reversing the polarity of the DC supply to reverse the direction of operation of the amplifier.

7. A bidirectional amplifier for use between a pair of signal receiving and sending means, comprising:

a transistor having a base electroed and a pair of output electrodes;

a pair of supply terminals for supplying a DC operating potential to the amplifier;

a first resistive means in series relation between one output electrode and one supply terminal, one of said signal receiving and sending means being coupled across said first resistive means;

a second resistive means in series relation between the other output electrode and the other supply terminal, the other of said signal receiving and sending means being coupled across said second resistive means;

a bias circuit for supplying an operating bias to said base electrode, said circuit having a first capacitor in series relation between said base and one supply terminal, and a switching means connected to said supply terminals for reversing the polarity of the DC supply to reverse the direction of operation of the amplifier.

8. The bidirectional amplifier of claim 7 in which a capacitor is in series relation between each output electrode and the corresponding signal receiving and sending means, and said bias circuit has a third resistive means in parallel relation with said first capacitor and a fourth resistive means in series relation between the base electrode and the other supply terminal.

9. The bidirectional amplifier of claim 7 in which a capacitor is in series relation between each output electrode and the corresponding signal receiving and sending means, said bias circuit has a second capacitor in series relation between said base electrode and the other supply terminal, and said switching means includes a pair of resistors, one of said resistors being connected between said base electrode and the DC supply when the switching means is in one position, and the other of said resistors being connected between said base electrode and the DC supply when the switching means reverses the polarity of the DC supply.

References Cited

UNITED STATES PATENTS

| | | | |
|---|---|---|---|
| 2,659,774 | 11/1953 | Barney. | |
| 2,733,304 | 1/1956 | Koenig. | |
| 2,763,832 | 9/1956 | Shockley | 323—94 |
| 3,172,960 | 3/1965 | Voyles. | |

| | | | |
|---|---|---|---|
| 3,289,088 | 11/1966 | Berger | 325—408 |
| 3,316,487 | 4/1967 | Friedberg et al. | 325—15 |
| 3,431,366 | 3/1969 | Rodek. | |

KATHLEEN H. CLAFFY, Primary Examiner

W. A. HELVESTINE, Assistant Examiner

U.S. Cl. X.R.

330—32, 40; 325—5; 343—181